C. P. WATEROUS.
TRANSMISSION GEARING.
APPLICATION FILED MAR. 7, 1916.

1,250,738.

Patented Dec. 18, 1917.
6 SHEETS—SHEET 6.

WITNESSES

INVENTOR
CHARLES P. WATEROUS
BY
ATTORNEYS

UNITED STATES PATENT OFFICE.

CHARLES P. WATEROUS, OF ST. PAUL, MINNESOTA, ASSIGNOR TO WATEROUS ENGINE WORKS COMPANY, OF ST. PAUL, MINNESOTA, A CORPORATION OF MINNESOTA.

TRANSMISSION-GEARING.

1,250,738.  Specification of Letters Patent.  Patented Dec. 18, 1917.

Application filed March 7, 1916. Serial No. 82,532.

*To all whom it may concern:*

Be it known that I, CHARLES P. WATEROUS, a citizen of the United States, resident of St. Paul, county of Ramsey, State of Minnesota, have invented certain new and useful Improvements in Transmission - Gearing, of which the following is a specification.

My invention relates particularly to a transmission gearing for automobile fire engines, and the object of the invention is to provide a mechanism by means of which the power of the engine can be easily and quickly shifted from the differential and the road driving mechanism to the pump when the engine has been stationed at a hydrant, or other water supply, and be as readily transferred to the differential, and the road driving mechanism when it is desired to stop the pump and change the position of the engine or return it to the fire-house.

A further object is to provide a shifting mechanism controlled by the forward and backward movement of a single lever, operating in one direction to shift the drive from differential to the pump and in the other direction to shift the power from the pump back to the differential.

Other objects of the invention will appear from the following detailed description.

The invention consists generally in various constructions and combinations, all as hereinafter described and particularly pointed out in the claims.

Figure 1:
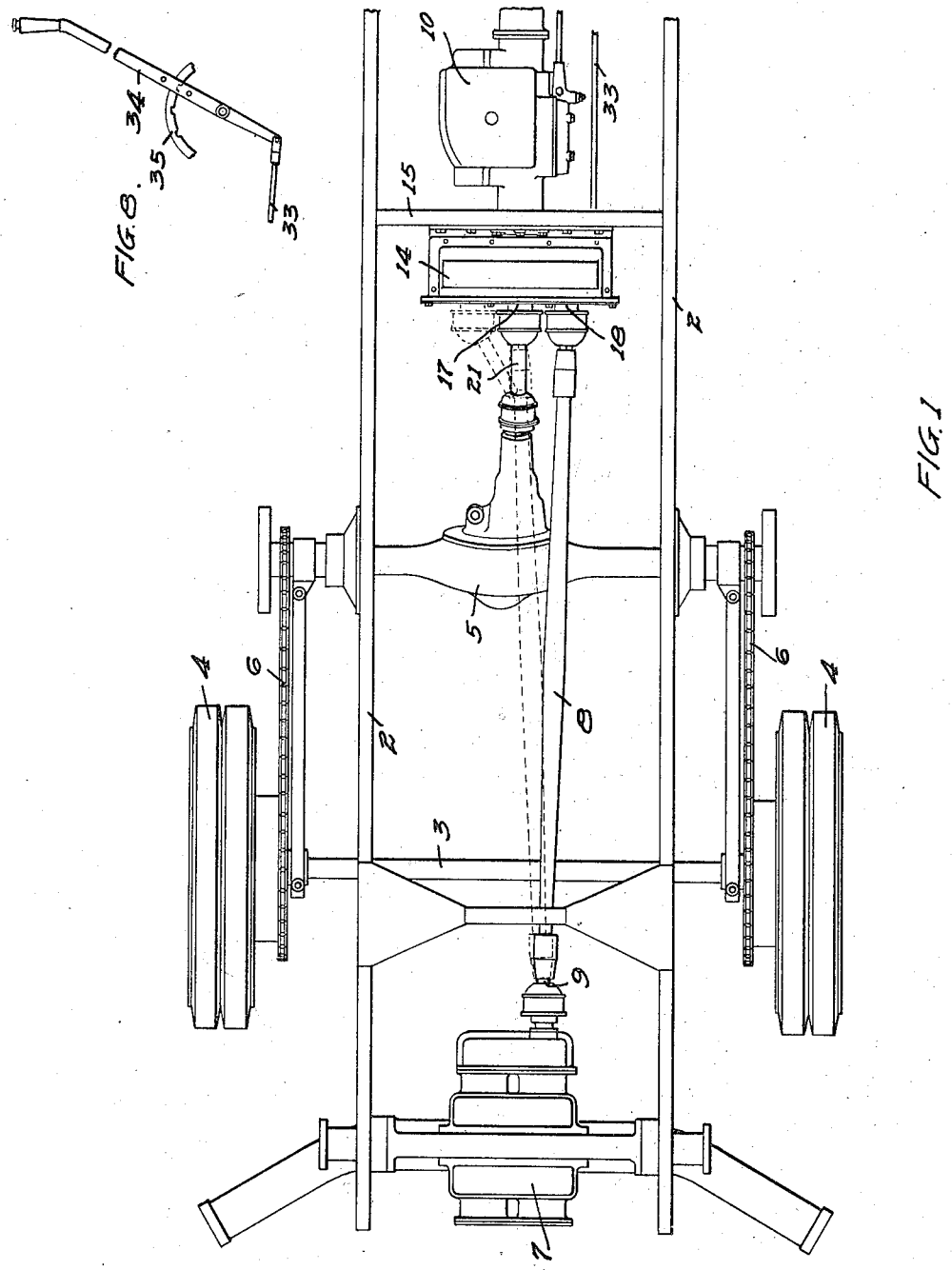
Figure 2:
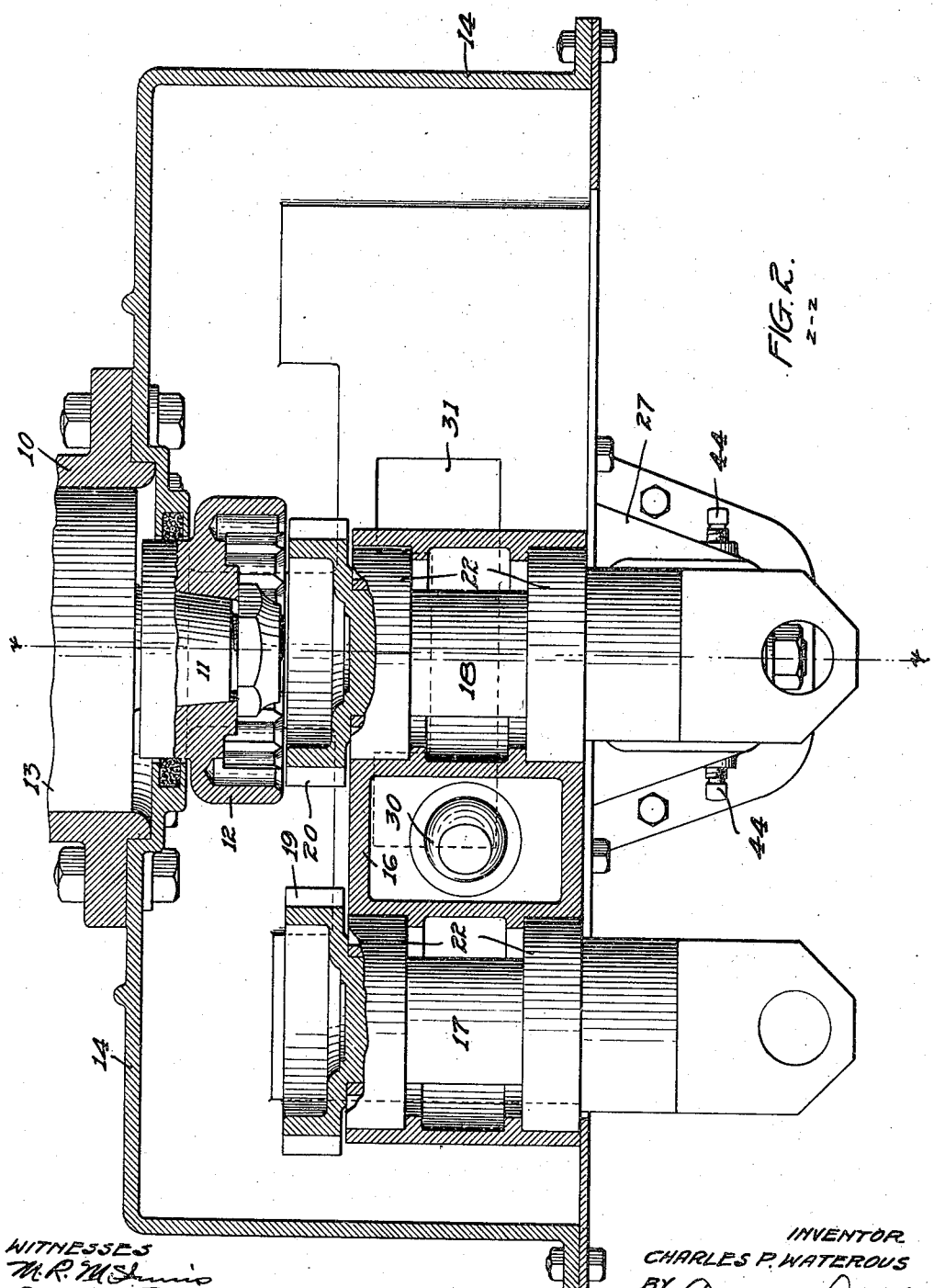
Figure 3:
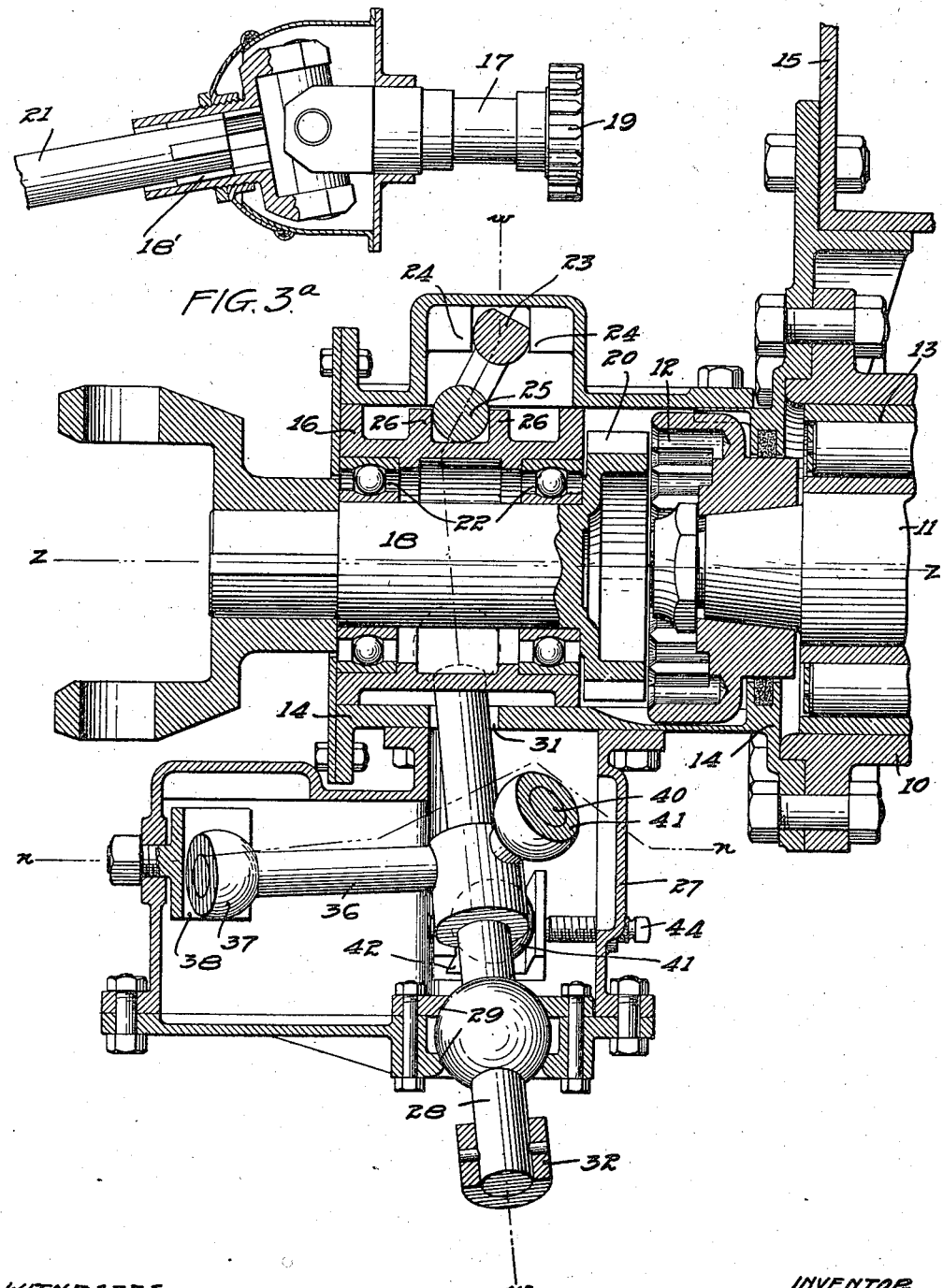
Figure 4:
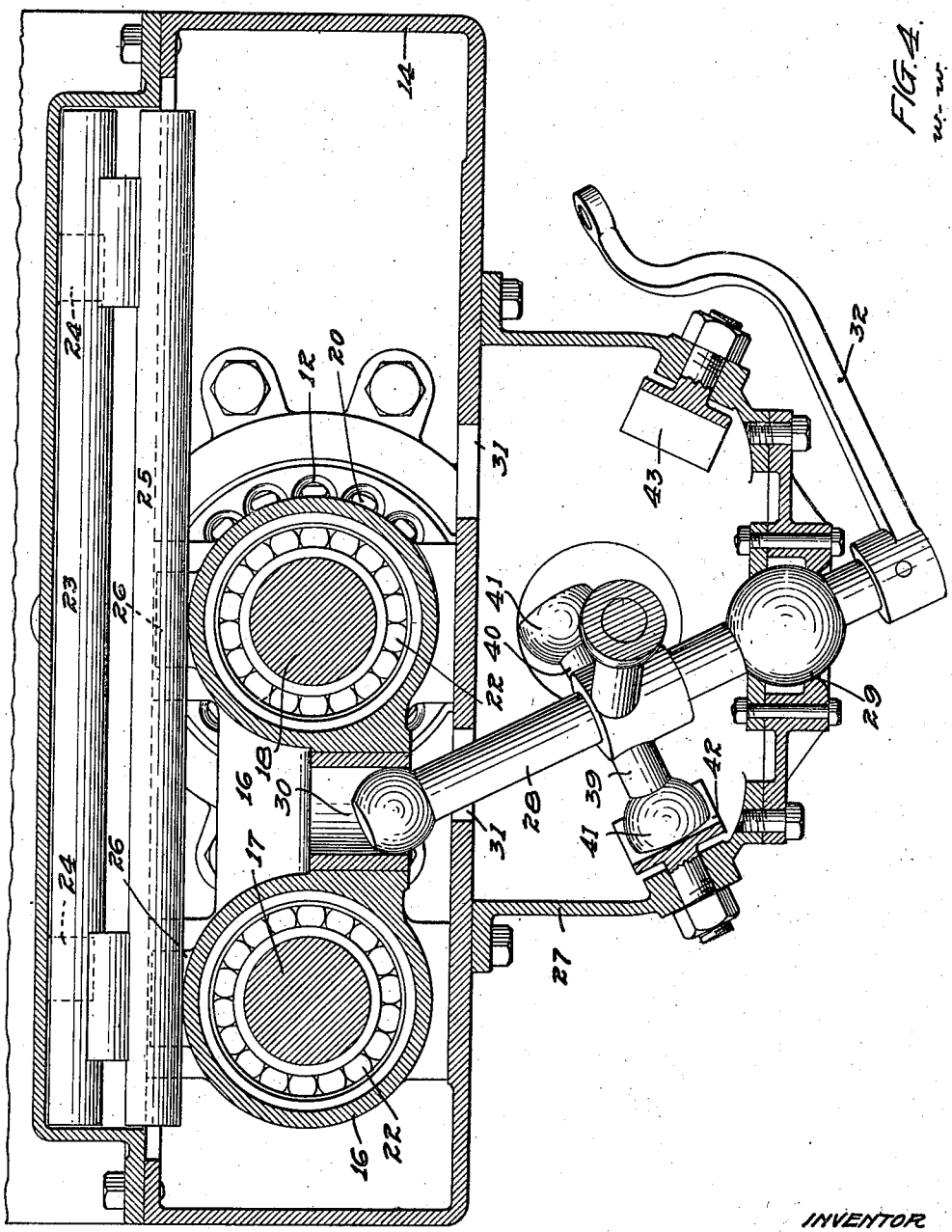
Figure 5:
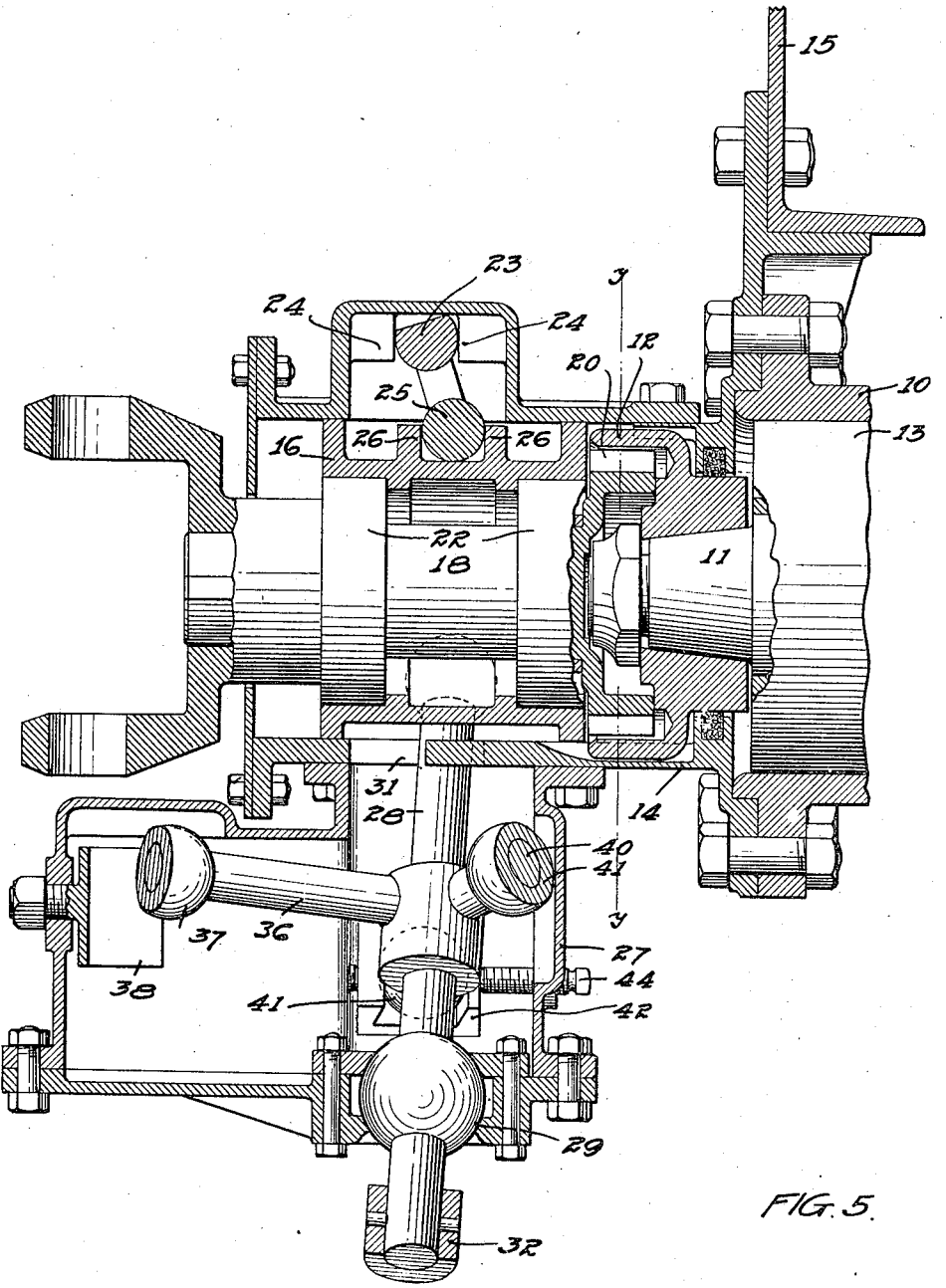
Figure 6:
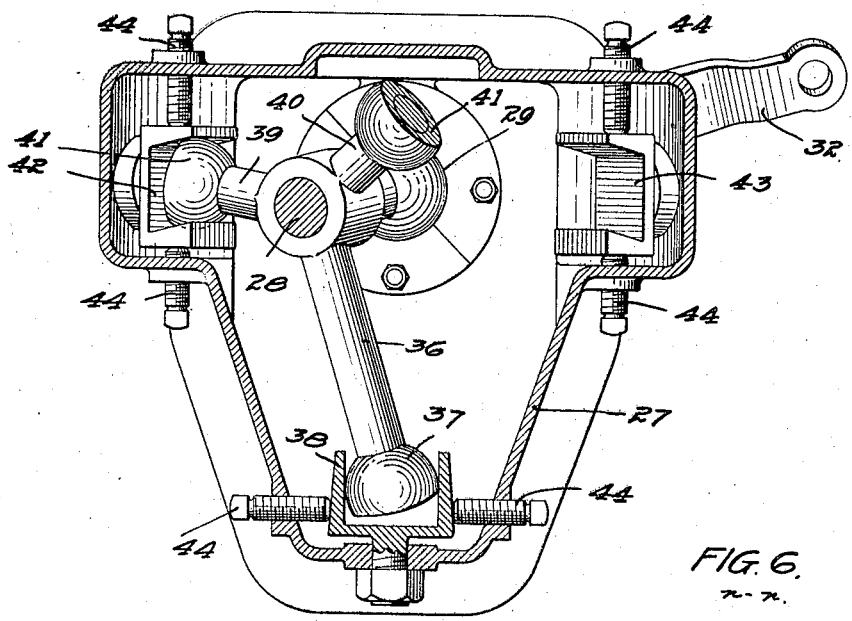
Figure 7:
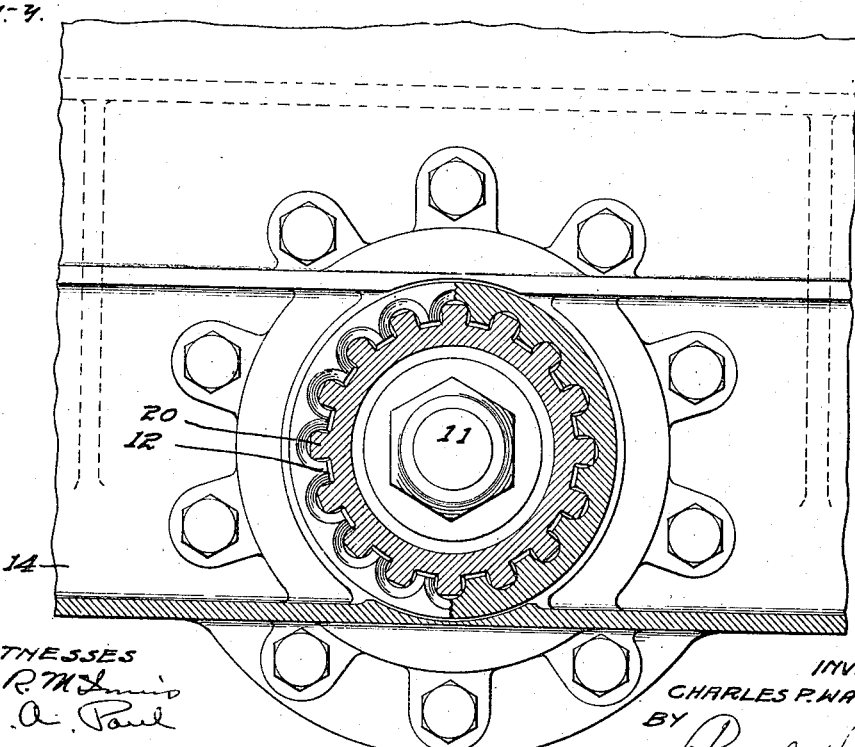

In the accompanying drawings forming part of this specification,

Figure 1 is a plan view of the rear portion of the chassis of an automobile fire engine with my invention applied thereto, Fig. 2 is a plan sectional view of the shifting mechanism, taken on the section line $z$—$z$ of Fig. 3, Fig. 3 is a vertical sectional view on the line $x$—$x$ of Fig. 2, showing one of the shifting gears in position to mesh with the gear of the transmission shaft, Fig. 3ª is a detail sectional view showing the universal joint connection between the couplings and the differential and pump shaft, Fig. 4 is a sectional view on the line $w$—$w$ of Fig. 3, Fig. 5 is a view, similar to Fig. 3, showing a shifter gear in mesh with the gear of the transmission shaft, Fig. 6 is a detail sectional view on the line $n$—$n$ of Fig. 3, Fig. 7 is a sectional view on the line $y$—$y$ of Fig. 5

Fig. 8 is a detail view showing the operating lever capable of movement forward or backward for operating the shifting mechanism.

In the drawing, 2 represents the frame of the engine, having a rear axle 3 and carrying wheels 4. 5 is the differential casing of ordinary construction, with its shaft connected to the rear axle through the driving belts 6. 7 is a pump, mounted on the rear portion of the frame and having a drive shaft 8 connected with the pump at 9 to allow a limited lateral movement of the shaft in the operation of the shifting mechanism. At the forward end of the frame is a transmission 10 connected with the engine in any suitable or preferred manner, which I have not thought it necessary to illustrate herein.

11 is a transmission shaft on which is secured a drive gear 12. 13 is a bearing for the shaft and 14 is a box or casing for the shifter mechanism secured to a cross bar 15 and depending below the same and through the wall of which the internal gear 12 extends, as shown in Fig. 2. Mounted in the box 14 is a slide 16 having a movement transversely with respect to the gear 12 and also lengthwise thereof and the transmission shaft. In this slide couplings 17 and 18 are mounted, having gears 19 and 20 adapted to mesh with the teeth of the gear 12. These couplings are connected respectively with the forward end of the differential shaft 21 and the pump shaft 8, said connections being in the form of a universal joint and permitting relative movement of the slide and the shafts with which the couplings are connected. The feather key connections 18′ (see Fig. 3ª) of the couplings with the respective shafts allow a relative sliding movement to permit forward and backward movement of the gears 19 and 20 to engage them with the gear 12 or disengage them therefrom. The couplings have suitable bearings 22 in the slide. In the top of the shifter box a rocking member 23 is mounted between guides 24 and provided with a lower cylindrical portion 25 that is loosely seated in a guide 26 in the slide and whereon said slide is free to move lengthwise of the box and transversely of the transmission shaft. (See Fig. 3). The rocking of the member 23 on its bearings in the top of the shifter box allows the slide to be moved forward or backward with respect to the transmission pinion and engage the differential or pump coupling with said pinion or disengage them therefrom, as may be desired. I am thus able to effect a rapid shift of the power, so essential in the operation of a fire engine, from the differential and the wheel drive to the pump shaft. I prefer to operate this shifting mechanism from the driver's seat, both for convenience and to save time in coupling up the pump, and the mechanism which I prefer to employ for this purpose I will now describe in detail.

Referring to Fig. 3, 27 represents a casing, depending below the shifter box. A stud 28 has a universal bearing, preferably a ball and socket, at 29 in the bottom of said box. The upper end of said stud has a universal bearing at 30 in the bottom of the slide 16. The lower wall of said shifter box has an irregular slot 31 therein in which the upper end of the stud 28 is movable lengthwise of the box and transversely thereof to effect the desired movement of the slide and connect its couplings with the transmission pinion. The lower end of the stud 28 has a crank 32 thereon that is connected by suitable means, such as a rod 33, with the single operating lever 34 that is mounted at the forward portion of the engine adjacent to the driver's seat, (not shown), and provided with the usual quadrant 35 having the intermediate neutral position and one end for the running connection and the other for the pump connection, it being only necessary for the driver to grasp this lever and throw it back and forth on the quadrant to shift the couplings and change the drive from the differential to the pump and vice versa.

I prefer to mount a stud 28 in such a manner that the irregular movement of the shifter slide can be accomplished through a single forward or backward movement of the driver's lever in a straight line. I therefore provide an arm 36 projecting from the stud substantially at right angles thereto and having a ball 37 at its extremity, loosely mounted in a guide 38 that is secured to the wall of the casing 27 and forming a fulcrum on which the stud 28 may rock during a portion of its movement. This stud is also provided with oppositely arranged corresponding arms 39 and 40, both having balls 41 at their outer ends fitting within guides 42 and 43, also secured to the wall of the casing 27. All of these guides are held in place by suitable means, such as set screws 44, mounted in the wall of the casing and engaging the opposite walls of the guides.

Assuming that the parts are in the position indicated in Fig. 4, if it is desired to throw one of the coupling gears into mesh with the drive gear, the completion of the stroke of the driver's lever will rock the stud 28 on the arm 39, throw the slide forward and engage the coupling with the drive gear. If the connection with the other coupling is desired, reverse movement of the driver's lever will move the slide backward and continued movement will shift the slide from one side of the box to the other, the stud 28 rocking on the arm 36 until the arm 40 engages the guide 43. Then the direction of movement of the stud will be changed and it will swing forward, carrying the slide with it and engaging the other coupling with the drive gear. I am thus able, with a direct forward and backward movement of the single lever, to operate the shifter and its couplings in an indirect path and easily and quickly engage either the differential or pump coupling with the gear 12 or disengage them therefrom.

I have shown this invention applied to a fire engine, but it may be utilized for other purposes where a quick shift from one driven shaft to another is desired.

I claim as my invention:

1. The combination, with a fire engine frame having traction wheels, of a differential shaft having a driving connection with said wheels, a transmission shaft and drive gear therefor, a gear for said differential shaft, a pump mounted in said frame, a pump shaft, a gear for said pump shaft, a rocking device for first moving said differential shaft gear out of engagement with said drive gear, shifting said differential shaft out of alinement with said drive gear and moving said pump shaft into alinement with said drive gear, and sliding said pump shaft gear into engagement with said drive gear, and a single lever for operating said rocking device.

2. The combination, with a frame having traction wheels, of a differential shaft having a driving connection with said wheels, a driven shaft, gears for said shafts, a transmission shaft and drive gear therefor, a member whereon said differential shaft and said driven shaft are mounted for movement transversely of said transmission shaft, a lever and mechanism actuated by the movement of said lever in one direction for disengaging one of said gears from said drive gear, shifting said gears and shafts laterally to aline the other gear with said drive gear, and moving said other gear into engagement with said drive gear, movement of said lever in the opposite direction reversing the movement of said gears and shafts.

3. The combination, with a fire engine frame and traction wheels, of a differential shaft having a driving connection with said wheels, a gear for said shaft, a transmission shaft and drive gear, a pump mounted in said frame, a pump shaft, a gear for said pump shaft, said gears mounted to slide on said shafts into and out of engagement with said drive gear, said shafts having a limited lateral movement to aline said gears with said drive gear and means for shifting said shafts and gears.

4. The combination, with a frame and traction wheels, of a differential shaft having a driving connection with said wheels, a gear for said shaft, a transmission shaft and drive gear, a pump and shaft therefor, a gear for said pump shaft, said differential and pump gears mounted to slide on their shafts into and out of engagement with said drive gear, said differential and pump shafts having a limited lateral movement to aline said differential and pump gears with said drive gear, and a lever mechanism for shifting said differential and pump shafts and gears.

5. The combination, with a frame having traction wheels, of a differential shaft having driving connection with said wheels, a driven shaft, gears for said shafts respectively, a transmission shaft and drive gear therefor, a slide wherein said differential shaft and said driven shaft are mounted for lateral movement in said frame and mechanism including a single lever mounted for disengaging a gear from said drive gear during its initial movement, shifting said slide to aline the other gear with said drive gear during its intermediate movement, and engaging the other gear with said drive gear during the final movement of said lever.

6. The combination, with a frame having traction wheels, of a differential shaft having driving connection with said wheels, a driven shaft, gears for said shafts, a transmission shaft and drive gear therefor, a slide whereon said differential shaft and said driven shaft are mounted for movement transversely of said transmission shaft, a lever and mechanism actuated by the movement of said lever in one direction for disengaging one of said gears from said drive gear, shifting said gears and shafts laterally to aline the other gear with said drive gear and moving said other gear into engagement with said drive gear, movement of said lever in the opposite direction reversing the movement of said gears and shafts.

7. The combination, with a frame having traction wheels, of a differential shaft having a driving connection with said wheels, a driven shaft, gears for said shafts respectively, a slide wherein said differential shaft and said driven shaft are mounted for lateral movement in said frame, a transmission shaft and drive gear therefor, a rocking member having a bearing in said slide and mounted to move it and said gears and shafts transversely of said transmission shaft and engage said gears respectively with said transmission drive gear at the end of the lateral movement of said slide in each direction, and a lever mechanism for operating said rocking member.

8. The combination, with a frame having traction wheels, of a differential shaft having a driving connection with said wheels, a driven shaft, gears for said shafts respectively, a transmission shaft and drive gear therefor, a slide wherein said differential shaft and said driving shaft are mounted for movement transversely of said transmission shaft to aline either one or the other of said gears with said transmission shaft, said slide also having a movement lengthwise of said transmission shaft for shifting said gears into and out of engagement with said drive gear and mechanism for operating said slide.

9. The combination, with a frame having traction wheels, of a differential shaft having a driving connection with said wheels, a driven shaft, gears for said shafts respectively, a transmission shaft and drive gear therefor, a slide wherein said differential shaft and said driving shaft are mounted for movement transversely of said transmission shaft to aline one or the other of said gears with said transmission shaft, said slide also having a movement lengthwise of said transmission shaft for shifting said gears into and out of engagement with said drive gear and mechanism for operating said slide, said mechanism including a single lever movable in one direction for shifting said slide to disengage one gear and engage the other with said drive gear and movable in the opposite direction for reversing the position of said gears.

In witness whereof, I have hereunto set my hand this 23d day of February, 1916.

CHARLES P. WATEROUS.

Witnesses:
GENEVIEVE E. SORENSEN,
EDWARD A. PAUL.